(12) United States Patent
Horng et al.

(10) Patent No.: US 8,294,397 B2
(45) Date of Patent: Oct. 23, 2012

(54) SENSORLESS STARTING CONTROL METHOD FOR A BLDC MOTOR

(75) Inventors: Alex Horng, Kaohsiung (TW); Chieh-Feng Lee, Kaohsiung (TW); Tsung-Hsien Yeh, Kaohsiung (TW)

(73) Assignee: Sunonwealth Electronic Machine Industry Co., Ltd., Kaohsiung (TW)

( * ) Notice: Subject to any disclaimer, the term of this patent is extended or adjusted under 35 U.S.C. 154(b) by 325 days.

(21) Appl. No.: 12/725,976

(22) Filed: Mar. 17, 2010

(65) Prior Publication Data
US 2011/0227519 A1    Sep. 22, 2011

(51) Int. Cl.
*H02P 6/04*    (2006.01)
(52) U.S. Cl. ......... 318/400.11; 318/400.32; 318/400.36; 318/400.25; 318/254; 361/23; 702/106
(58) Field of Classification Search .......... 318/798–815, 318/431, 54, 65, 86, 101, 102, 103, 400.32–400.36, 318/400.33, 400.35, 400.25, 400.24, 400.13, 318/254, 700, 400.1, 439, 138, 720–724, 318/400.11; 361/23
See application file for complete search history.

(56) References Cited

U.S. PATENT DOCUMENTS

| | | | |
|---|---|---|---|
| 6,100,656 A * | 8/2000 | El-Sadi et al. | 318/400.11 |
| 7,334,854 B1 * | 2/2008 | Chang et al. | 318/400.11 |
| 7,573,218 B2 | 8/2009 | Yu et al. | |
| 7,652,441 B2 * | 1/2010 | Ying Yin Ho | 318/400.32 |
| 2002/0185926 A1 * | 12/2002 | King et al. | 310/68 B |
| 2004/0249596 A1 * | 12/2004 | Ho | 702/106 |

* cited by examiner

*Primary Examiner* — Walter Benson
*Assistant Examiner* — Jorge Carrasquillo
(74) *Attorney, Agent, or Firm* — Muncy, Geissler, Olds & Lowe, PLLC (57) ABSTRACT

A sensorless starting control method for a brushless direct current (BLDC) motor, comprising a first rotor-positioning step configured to position a rotor in a first position by operating a coil unit in a first excitation state, a second rotor-positioning step configured to operate the coil unit in a second excitation state such that the rotor rotates from the first position to a second position, and an open-looped starting step configured to excite a plurality of coils of the coil unit in sequence so as to drive the rotor to rotate in a predetermined direction, wherein the coil unit generates a back electromotive force (EMF) when the rotor rotates in the predetermined direction. The method further comprises a close-looped operation step configured to control the BLDC motor to attain a predetermined rotational speed via a feedback of the back EMF.

8 Claims, 14 Drawing Sheets

SENSORLESS STARTING CONTROL METHOD FOR A BLDC MOTOR

BACKGROUND OF THE INVENTION

1. Field of the Invention

The present invention generally relates to a starting control method for a brushless direct current (BLDC) motor and, more particularly, to a sensorless starting control method for a BLDC motor.

2. Description of the Related Art

In recent years, electric motors have been taking an important role in a variety of industrial applications. For example, a cooling fan is usually equipped in an electronic device for heat dissipation. Based on this, the BLDC motor has been widely used in the cooling fan to control the impeller rotation of the cooling fan so as to improve the cooling efficiency of the electronic products.

In some occasions while operating the BLDC motor, a Hall sensor is generally used to detect the locations of magnetic poles of a rotor in advance so as to control the rotation of the rotor. In some applications, however, the Hall sensor may become useless due to the operation environment. For example, in an environment where a compressor is operated with an extreme high temperature, the Hall sensor tends to malfunction easily due to the high operation temperature generated by the compressor.

Figure 1:
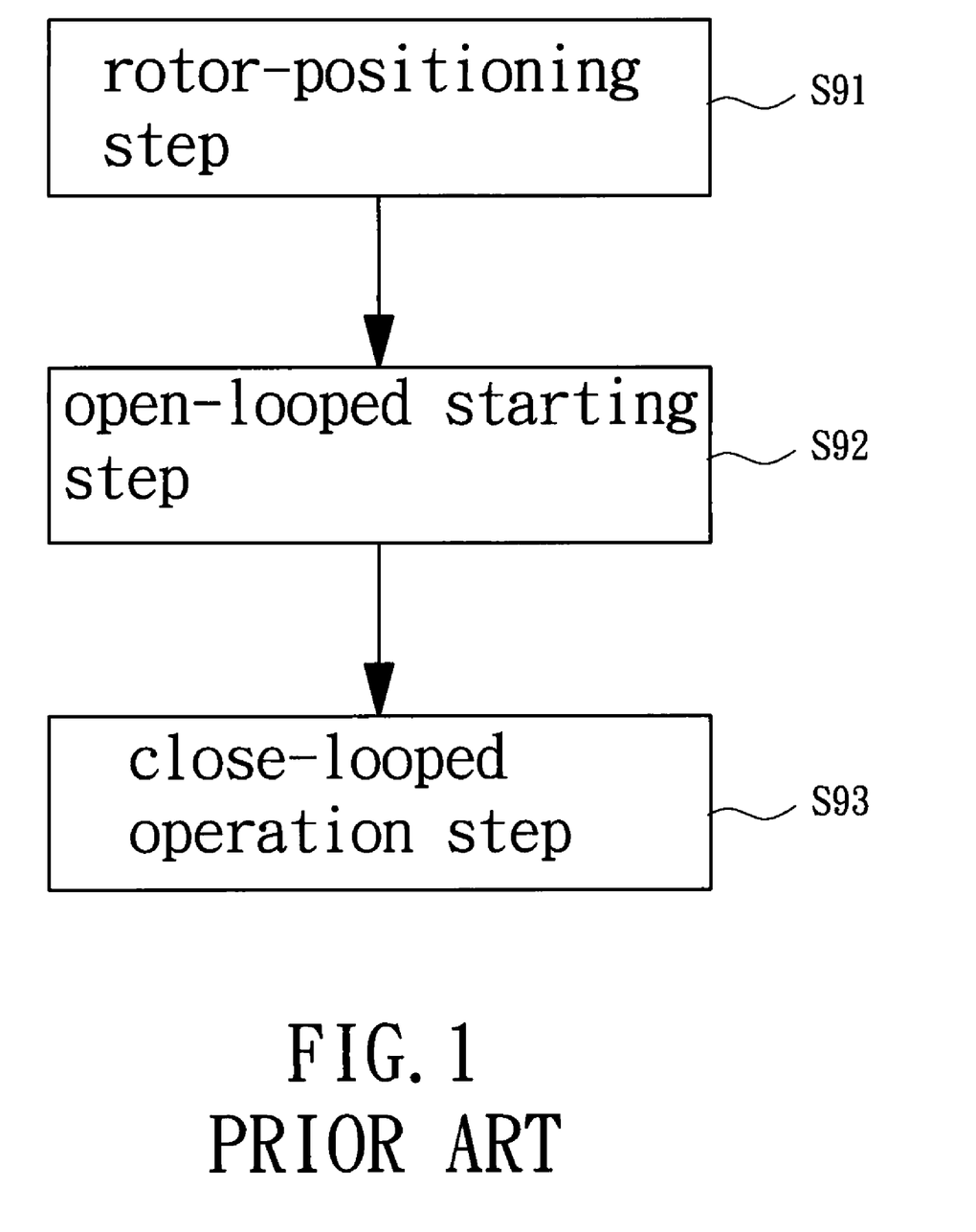
FIG. 1 shows a sensorless starting control method for a traditional BLDC motor.

There have been sensorless starting control methods proposed for solving the problem described above, as described below. Please refer to FIG. 1, a sensorless starting control method for a traditional BLDC motor is shown. The method comprises a rotor-positioning step S91, an open-looped starting step S92 and a close-looped operation step S93.

Figure 2:
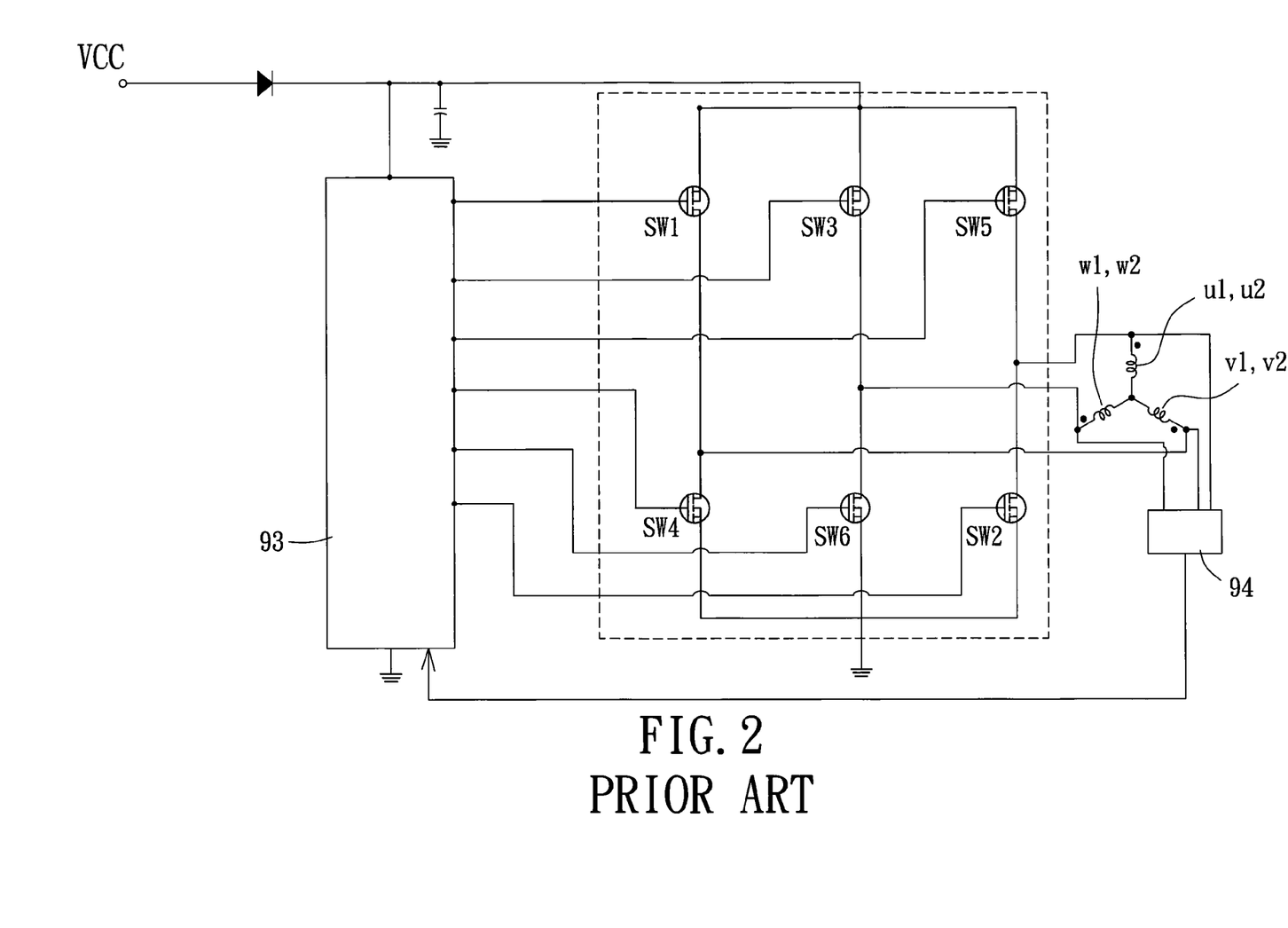
FIG. 2 shows a circuit diagram of a traditional three-phased BLDC motor.
Figure 3A:
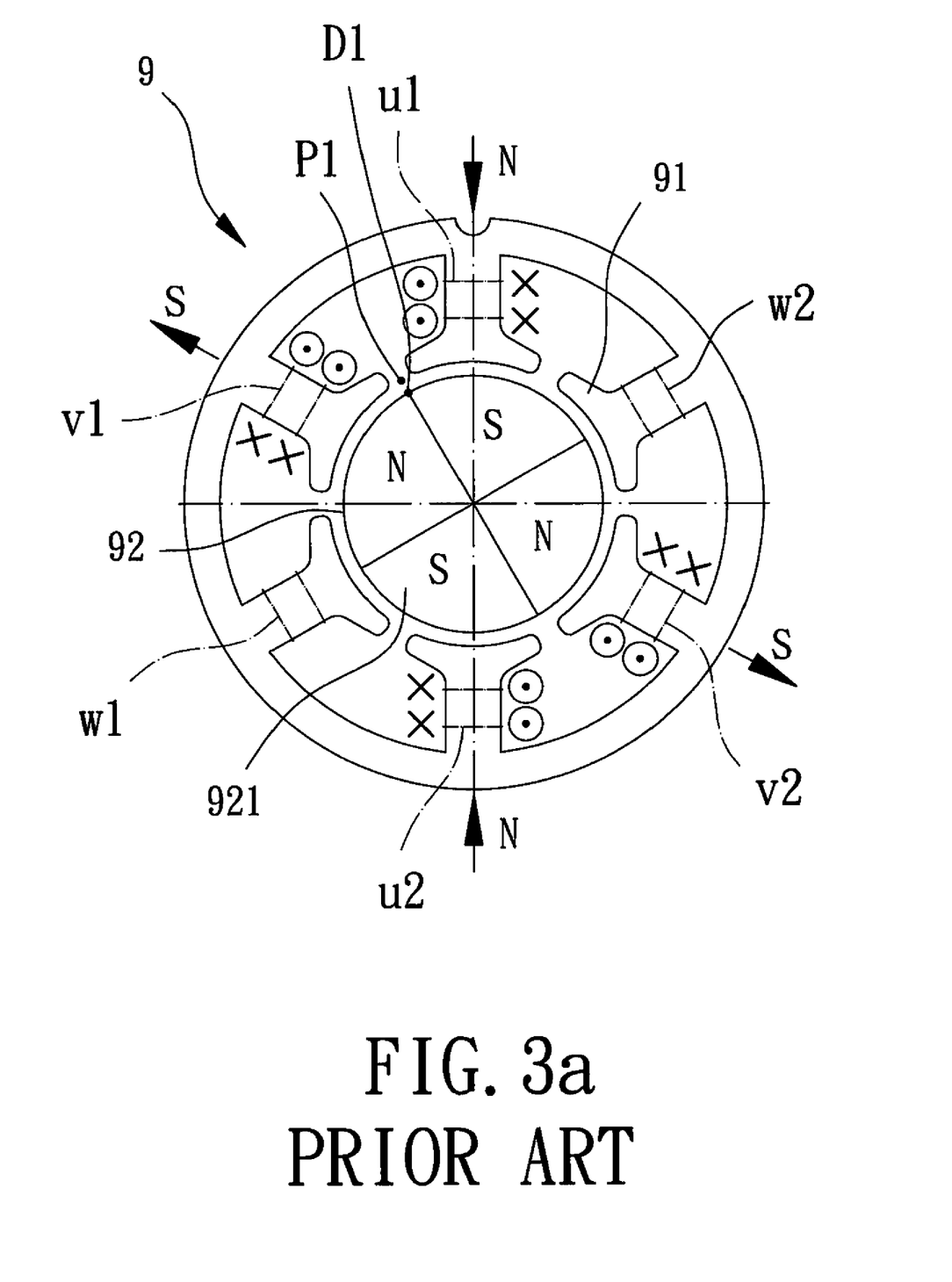
FIG. 3a shows the location of the stator magnetic poles and the rotor magnetic poles of the traditional three-phased BLDC motor operating in a rotor-positioning step.

Please refer to FIGS. 2 and 3a, a three-phased BLDC motor 9 is used as an example for illustration purpose. The BLDC motor 9 has six stator magnetic poles 91 and a rotor 92 having four rotor magnetic poles 921. Each of the stator magnetic poles 91 is wound with a respective one of three-phased coils u1, v1, w1, u2, v2 and w2.

Please refer to FIG. 2 again, a three-phased full-bridge inverter comprising six electronic switches SW1 to SW6 is disclosed. During the excitation of the coils u1, v1, w1, u2, v2 and w2, the BLDC motor 9 may control the direction and the amplitude of a current passing through any one of the coils u1, v1, w1, u2, v2 and w2 via the three-phased full-bridge inverter.

Figure 3B:
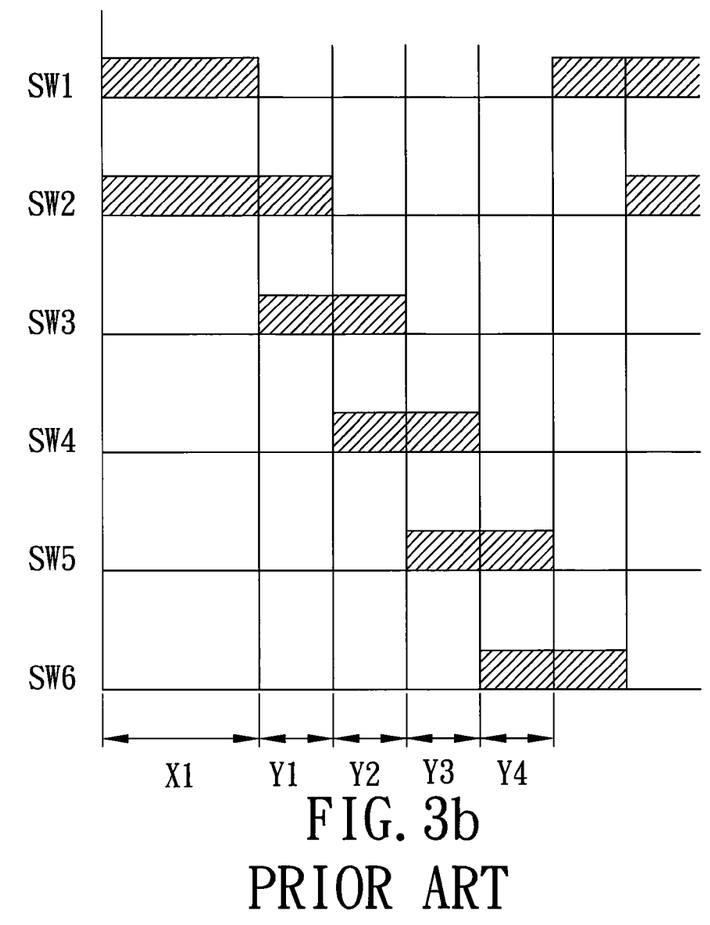
FIG. 3b shows a diagram of time intervals of a three-phased full-bridge inverter when the traditional three-phased BLDC motor is operated based on the sensorless starting control method.
Figure 3C:
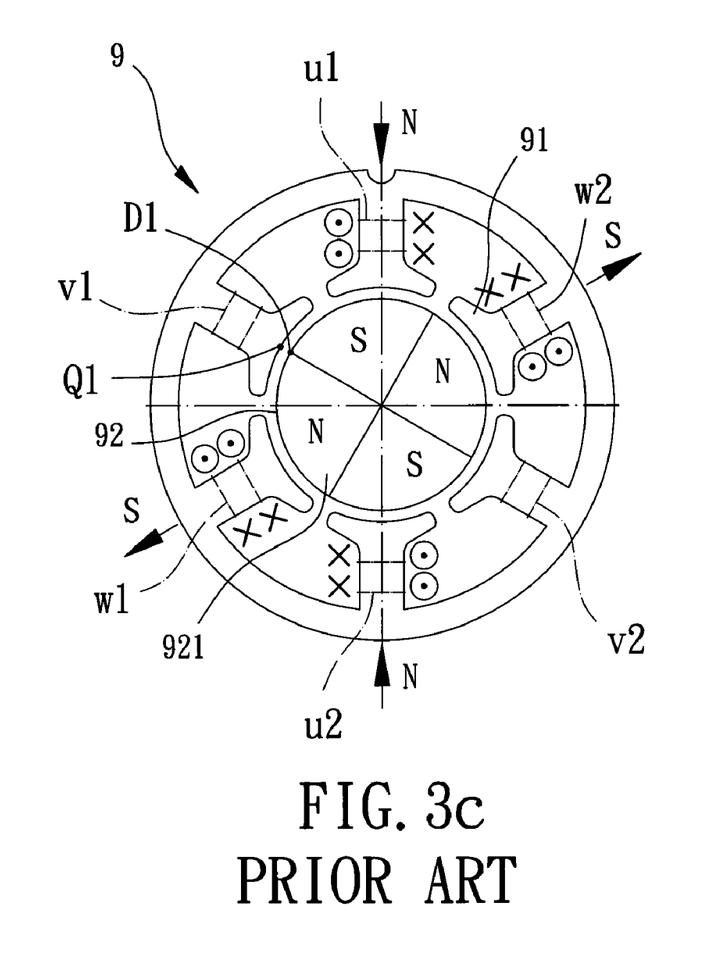
FIGS. 3c to 3f show the location of the stator magnetic poles and the rotor magnetic poles of the traditional three-phased BLDC motor operating in an open-looped starting step.
Figure 3D:
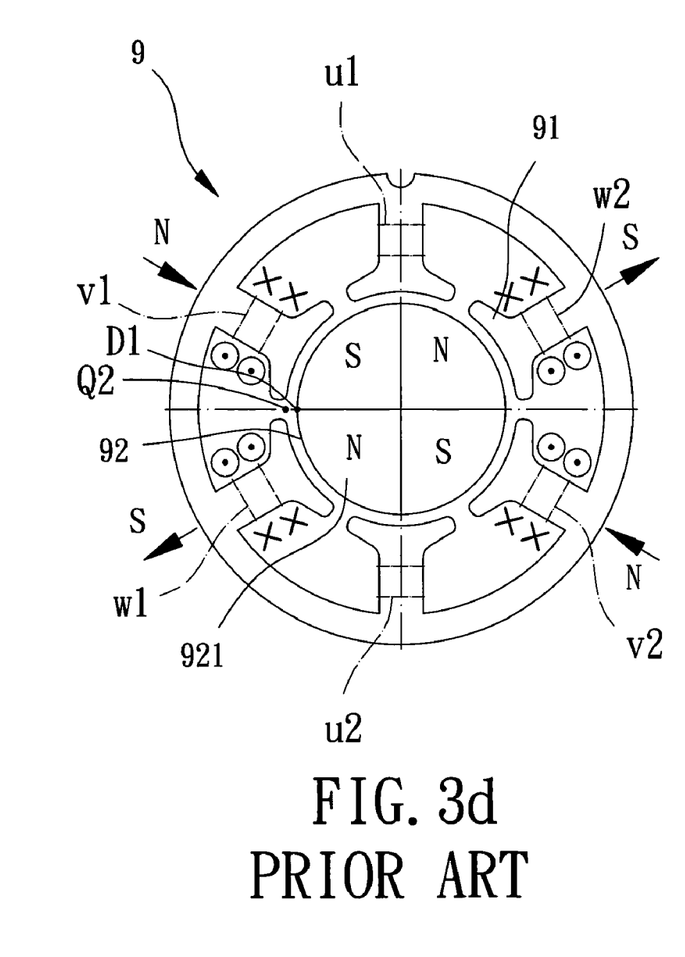
Figure 3E:
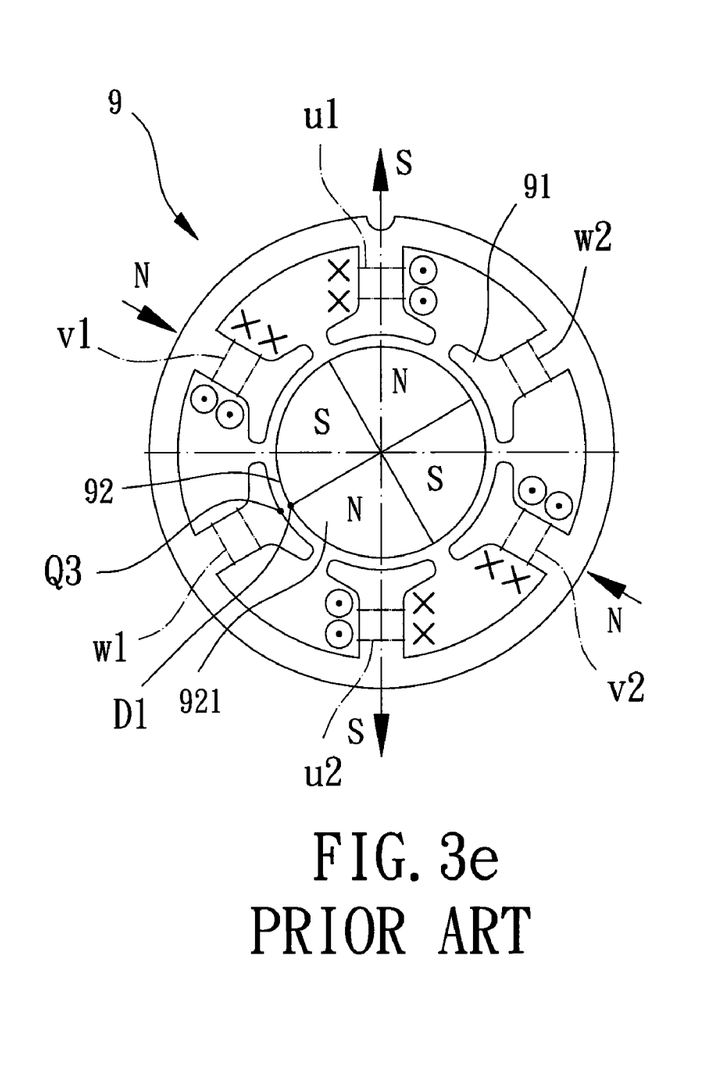
Figure 3F:
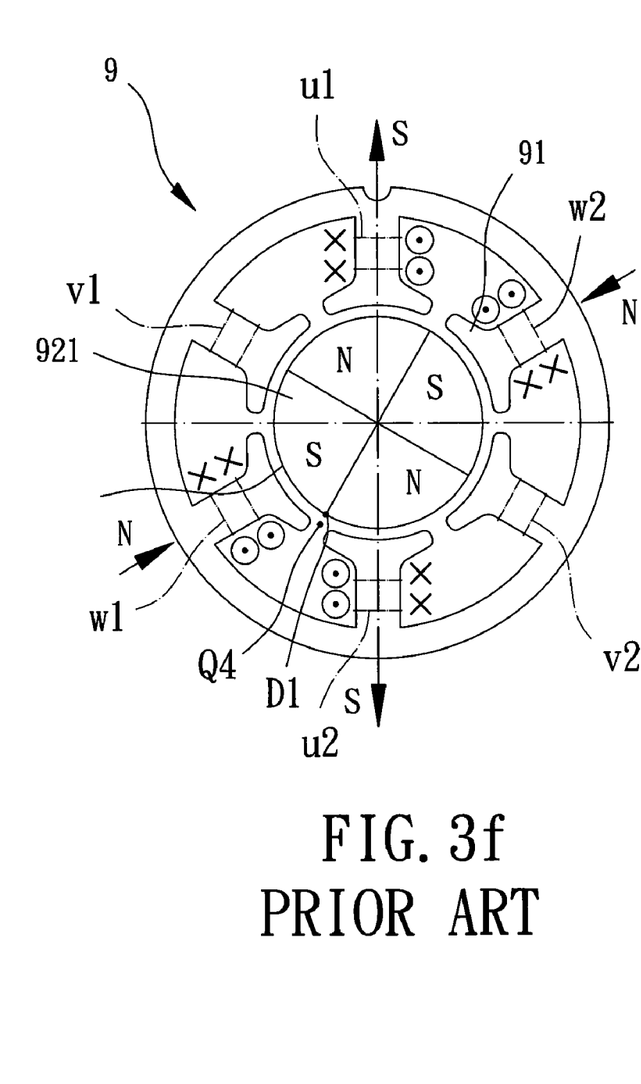

Please refer to FIGS. 2, 3a and 3b, during the rotor-positioning step S91, one of the coils u1, v1, w1, u2, v2 and w2 is excited by a supply voltage in order for the rotor 92 to be positioned in a stator starting position P1. More specifically, by turning on the electronic switches SW1 and SW2 for a time interval X1 (with references to FIGS. 2 and 3b), the coils u1 and u2 are excited by the supply voltage so that an N-pole magnetic field is generated (with reference to FIG. 3a). Similarly, the coils v1 and v2 are also excited by the supply voltage so that an S-pole magnetic field is generated. As a result, adjacent two of the rotor magnetic poles 921 with different magnetic poles may be magnetically attracted by the N-pole magnetic field generated by the coil u1 and the S-pole magnetic field generated by the coil v1, driving the rotor 92 to rotate by a small angle until a rotor magnetic pole border D1 where the adjacent two of the rotor magnetic poles 921 border each other is aligned with the stator starting position P1. The stator starting position P1 is located between two stator magnetic poles 91 respectively wound with coils u1 and v1, as shown in FIG. 3a.

Please refer to FIGS. 3c to 3f, during the open-looped starting step S92, each of the coils u1, v1, w1, u2, v2 and w2 is excited by the supply voltage in sequence based on a plurality of driving time intervals in order to drive the rotor 92 to rotate in a predetermined direction. Specifically, the three-phased full-bridge inverter having the electronic switches SW1 to SW6 in FIG. 2 is driven, with the electronic switches SW2 to SW6 switched in turn based on the driving time intervals Y1 to Y4 so as to control the directions of the currents passing through the coils u1, v1, w1, u2, v2 and w2. In the step, each coil of the BLDC motor 9 is excited in sequence, enabling the rotor 92 to rotate in the predetermined direction. As such, referring to FIGS. 3c to 3f, the rotor magnetic pole border D1 of the rotor 92 rotates in a counterclockwise direction through a first starting position Q1, a second starting position Q2, a third starting position Q3 and a fourth starting position Q4, thus creating a back electromotive force (EMF).

In the close-looped operation step S93, a controller 93 controls a close-looped rotational speed of the BLDC motor 9 based on a feedback of the back EMF. More specifically, referring to FIG. 2, the back EMF is sent to the controller 93 via a detection circuit 94 so as to control the BLDC motor 9 to rotate in a constant speed after the rotational speed of the BLDC motor 9 has achieved a predetermined level. According to the steps S91 to S93, the sensorless starting control method for the BLDC motor 9 is provided.

Figure 4:
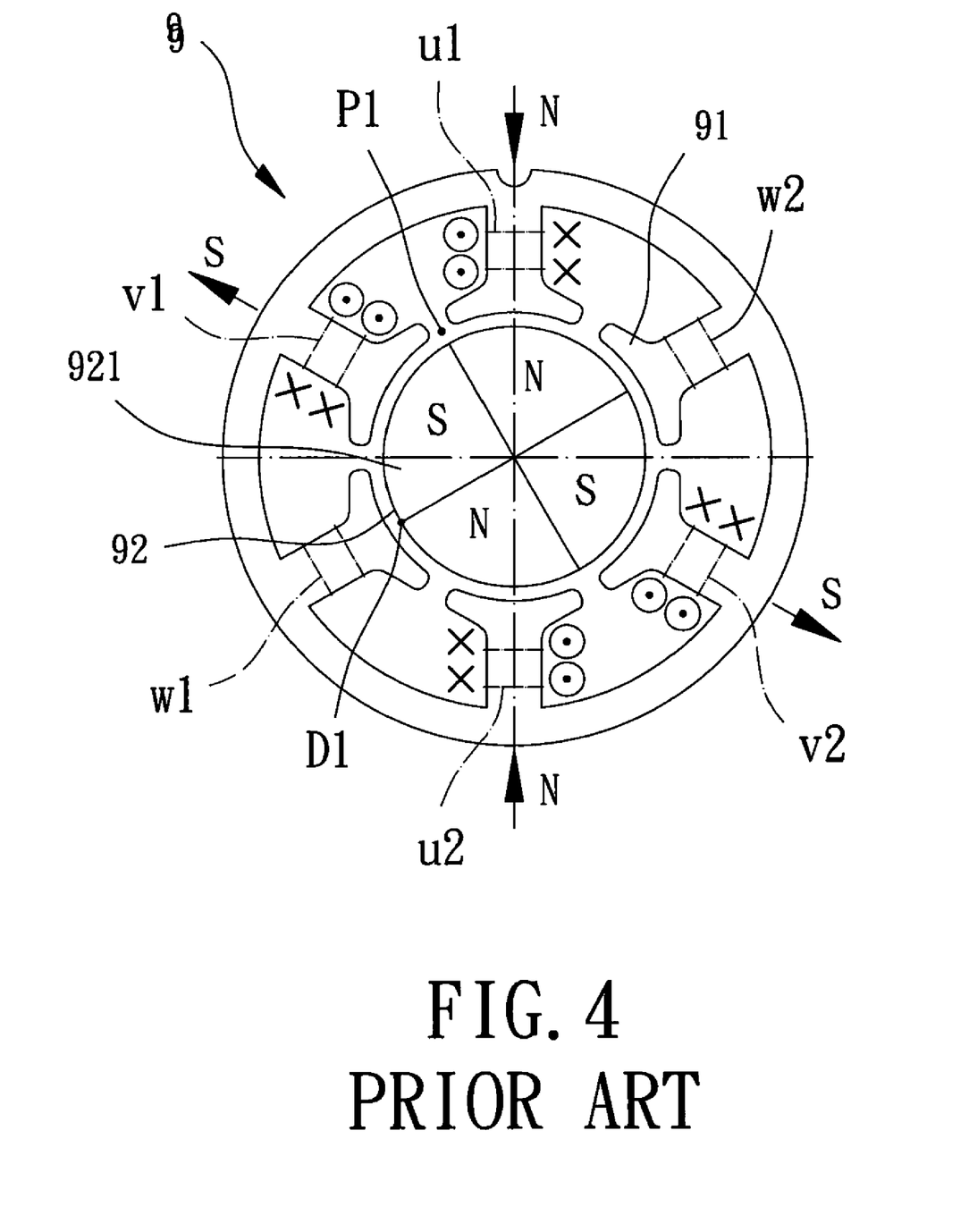
FIG. 4 shows the location of the stator magnetic poles and the rotor magnetic poles of the traditional three-phased BLDC motor when a dead angle has occurred.

In general, the above sensorless starting control method has some drawbacks as described below. Referring to FIG. 4, during the rotor-positioning step S91, the magnetic field generated by the coils u1, u2, v1 and v2 has the same polarity as that generated by the rotor magnetic poles 921, causing a rotation dead angle of the motor. In this case, the magnetic force generated by the coils u1, u2, v1 and v2 not only has the same magnitude as the magnetic force generated by the rotor magnetic poles 921, but also with opposite direction to the magnetic force generated by the rotor magnetic poles 921, causing the two magnetic forces to be offset by each other. As a result, the rotor magnetic pole border D1 of the rotor 92 can not be aligned with the stator starting position P1, leading to a failure of the subsequent open-looped starting step. In other words, the rotor 92 is not able to rotate through the starting positions Q1, Q2, Q3 and Q4 during the driving time intervals Y1 to Y4, causing an abnormal back EMF to be generated. As a result, the controller 93 operating based on a feedback of the abnormal back EMF fails to start the BLDC motor 9.

To solve the problem, a conventional method is to increase the supply voltage of the BLDC motor 9 in order to increase the starting torque of the BLDC motor 9. Although this method efficiently overcomes the problem of rotation dead angle of the BLDC motor 9, it significantly increases the power consumption.

Besides, once the rotor 92 is positioned in a dead angle where the angle difference between the rotor magnetic pole border D1 and the stator starting position P1 is 90 degree as shown in FIG. 4, the BLDC motor 9 is likely to rotate in a direction opposite to the predetermined direction during the open-looped starting step S92 when the supply voltage of the BLDC motor 9 is increased for performing the rotor-positioning step S91. Thereafter, as the conventional method proceeds to the close-looped operation step S93 as controlled by the controller 93, a back EMF generated by the BLDC motor 9 rotating in the direction opposite to the predetermined direction could sometimes be the same as a feedback control value preset in the controller 93, and the BLDC motor 9 may therefore keep on rotating in the wrong direction because the rotor 92 has been incorrectly determined to be operated in a normal condition by the controller 93. With the improper operation of the BLDC motor 9, the user may need to manually reset the BLDC motor 9, making it more inconvenient for operating the BLDC motor 9. Therefore, there exists a need to improve the sensorless starting control method for the BLDC motor 9.

SUMMARY OF THE INVENTION

It's the primary objective of the invention to provide a sensorless starting control method for a BLDC motor which overcomes a dead angle problem via two rotor-positioning steps, thereby improving the positioning accuracy of the BLDC motor.

It's another objective of the invention to provide a sensorless starting control method for a BLDC motor which positions a rotor of the BLDC motor via two rotor-positioning steps, with a coil excited with a lower voltage for power savings.

It's yet another objective of the invention to provide a sensorless starting control method for a BLDC motor which prevents the BLDC motor from rotating in a direction opposite to a predetermined direction via two rotor-positioning steps, thereby achieving easy start of the BLDC motor.

The invention discloses a sensorless starting control method for a brushless direct current (BLDC) motor, comprising a first rotor-positioning step configured to position a rotor in a first position by operating a coil unit in a first excitation state, a second rotor-positioning step configured to operate the coil unit in a second excitation state such that the rotor rotates from the first position to a second position, and an open-looped starting step configured to excite a plurality of coils of the coil unit in sequence so as to drive the rotor to rotate in a predetermined direction, wherein the coil unit generates a back electromotive force (EMF) when the rotor rotates in the predetermined direction. The method further comprises a close-looped operation step configured to control the BLDC motor to attain a predetermined rotational speed via a feedback of the back EMF.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 5:
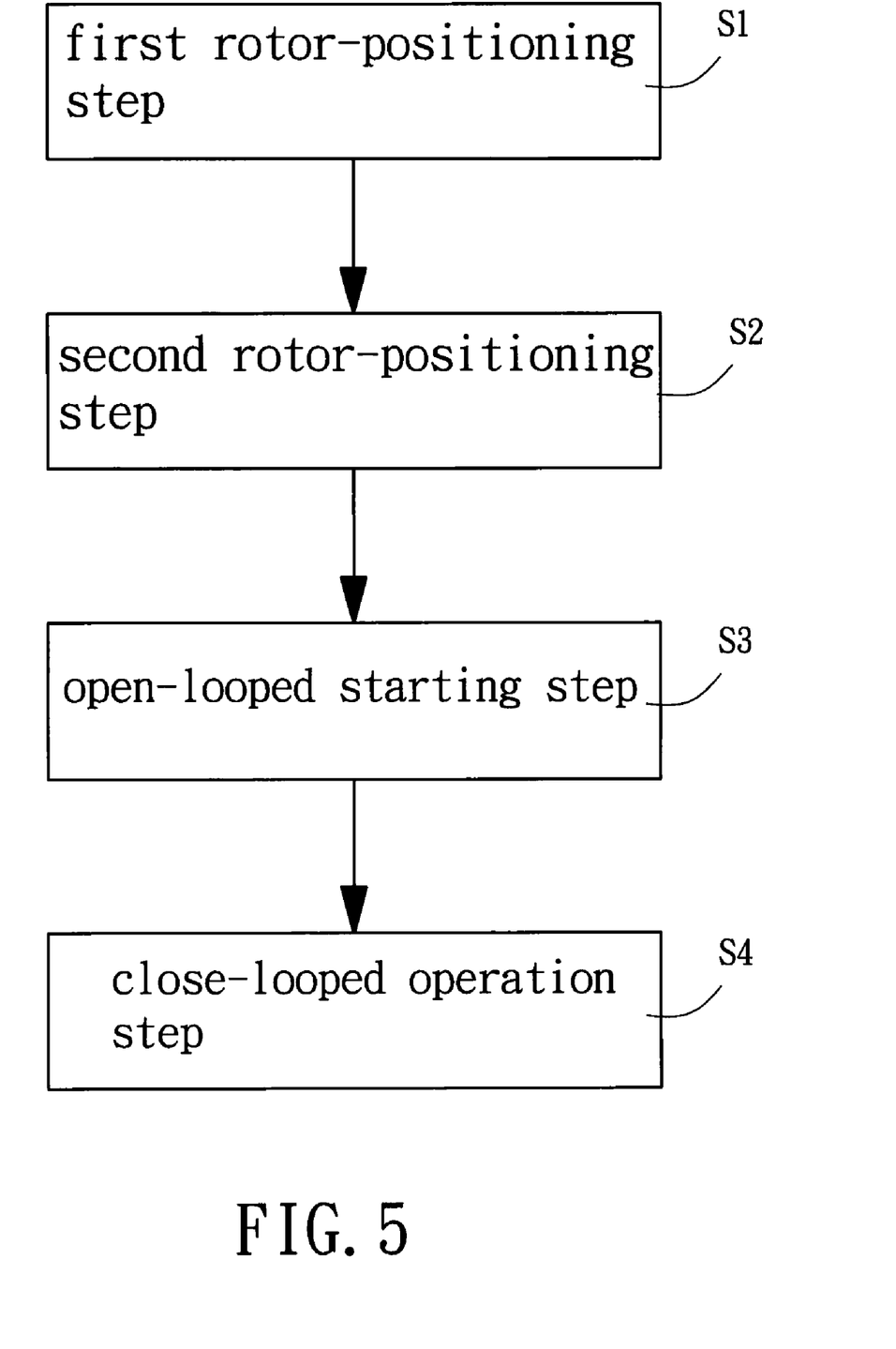
FIG. 5 shows a sensorless starting control method for a BLDC motor according to a preferred embodiment of the invention.

FIG. 5 shows a sensorless starting control method of a BLDC motor according to a preferred embodiment of the invention. The method comprises a first rotor-positioning step S1, a second rotor-positioning step S2, an open-looped starting step S3 and a close-looped operation step S4. Through the steps S1 to S4, the BLDC motor may stably rotate in a predetermined direction based on a predetermined rotational speed.

Figure 6:
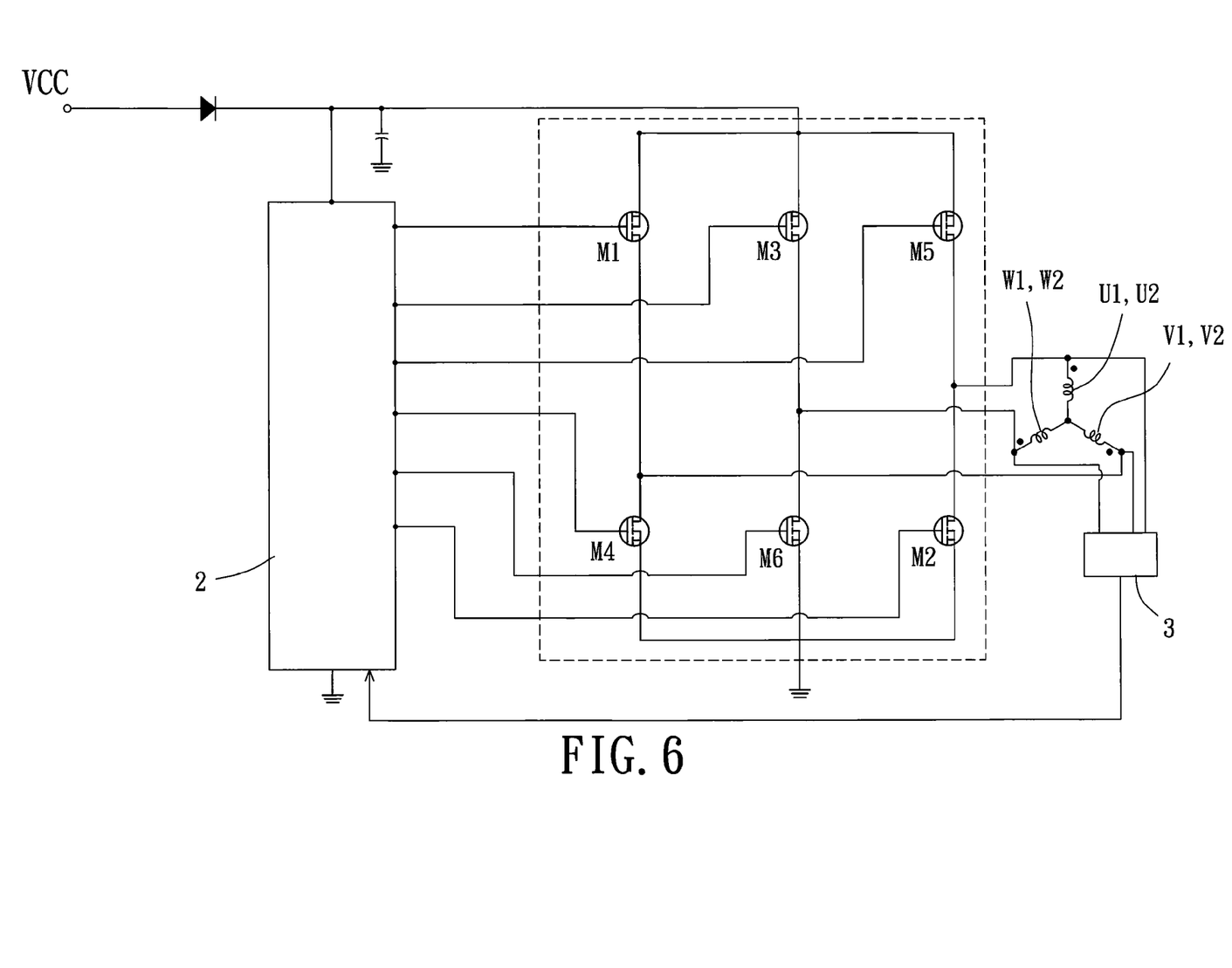
FIG. 6 shows a circuit diagram of a three-phased full-bridge inverter according to the preferred embodiment of the invention.
Figure 7A:
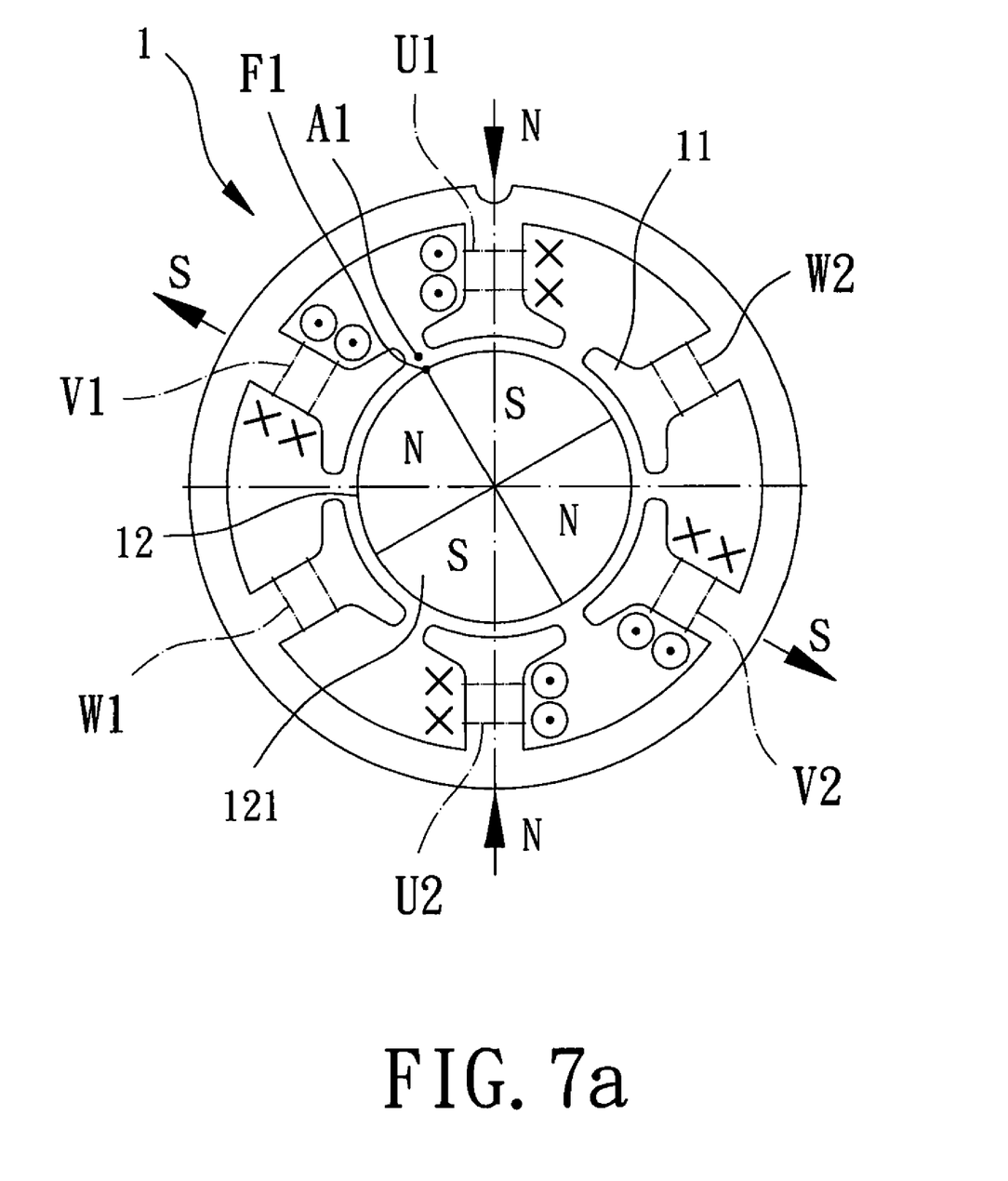
FIG. 7a shows the location of the stator magnetic poles and the rotor magnetic poles of the three-phased BLDC motor operating in a first rotor-positioning step according to the preferred embodiment of the invention.

Please refer to FIGS. 6 and 7a, a three-phased BLDC motor 1 is used as an example for illustrating a proposed sensorless starting control method, so as to compare the proposed method with the traditional sensorless starting control method. The BLDC motor 1 comprises six stator magnetic poles 11 and a rotor 12 having four rotor magnetic poles 121. Each of the stator magnetic poles 11 is wound with a respective one of the coils U1, V1, W1, U2, V2 and W2, with the coils U1, V1, W1, U2, V2 and W2 jointly forming a coil unit.

FIG. 6 discloses a three-phased full-bridge inverter comprising six electronic switches M1 to M6. During the excitation of the coils U1, V1, W1, U2, V2 and W2, the direction of current passing through the coils U1, V1, W1, U2, V2 and W2 of the BLDC motor 1 may be controlled via the three-phased full-bridge inverter.

Figure 7B:
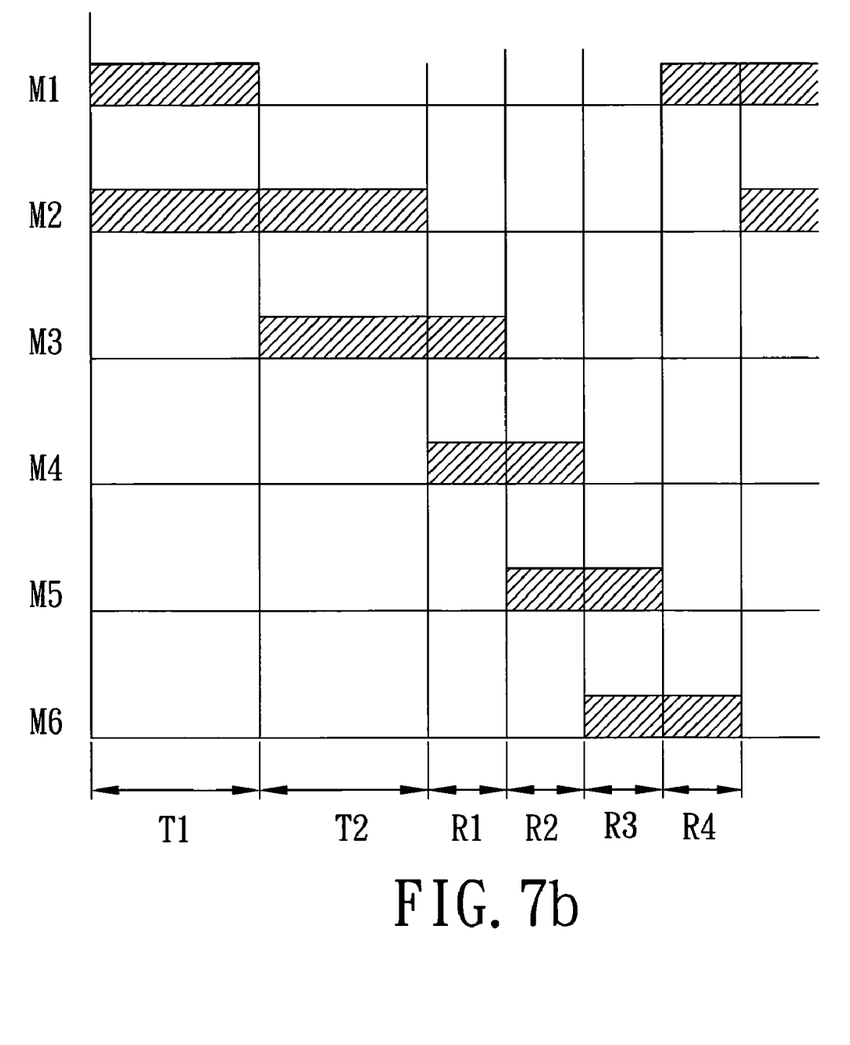
FIG. 7b shows a diagram of time intervals of a three-phased full-bridge inverter when the three-phased BLDC motor is operated based on the proposed sensorless starting control method.

Please refer to FIGS. 6, 7a and 7b, during the first rotor-positioning step S1, the coil unit is operated in a first excitation state in order for the rotor 12 to be positioned in a first position A1. More specifically, by turning on the electronic switches M1 and M2 for a first positioning time intervals T1 (with references to FIGS. 6 and 7b), the coils U1 and U2 are excited to generate an N-pole magnetic field and the coils V1 and V2 are excited to generate an S-pole magnetic field (with reference to FIG. 7a). Based on this, adjacent two of the rotor magnetic poles 121 with different magnetic poles may be magnetically attracted by the N-pole magnetic field generated by the coil U1 and the S-pole magnetic field generated by the coil V1 respectively, driving the rotor 12 to rotate in a small angle until a rotor magnetic pole border F1 where the adjacent two of the rotor magnetic poles 121 border each other is aligned with the first position A1. The first position A1 is located between two stator magnetic poles 11 respectively wound with coils U1 and V1, as shown in FIG. 7a.

Figure 7C:
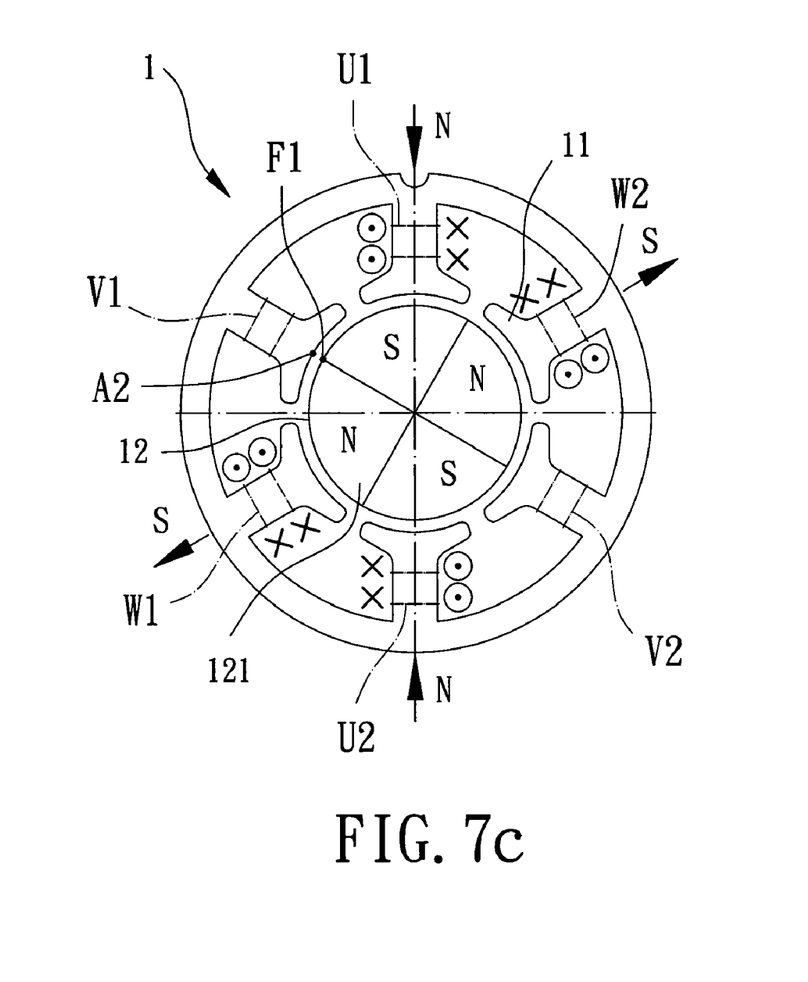
FIG. 7c shows the location of the stator magnetic poles and the rotor magnetic poles of the three-phased BLDC motor operating in a second rotor-positioning step according to the preferred embodiment of the invention.
Figure 7D:
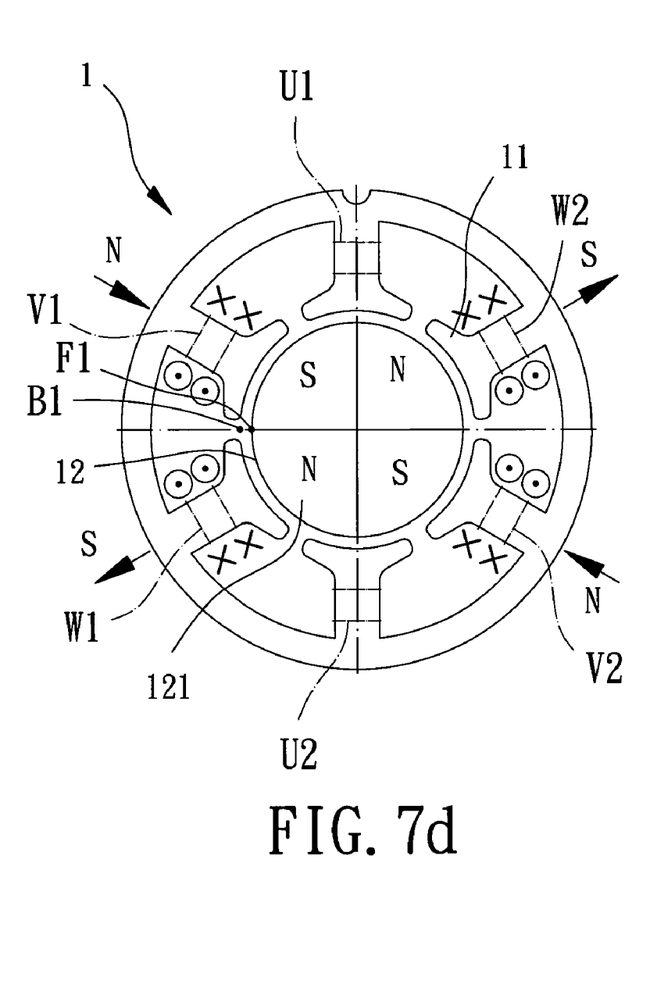
FIGS. 7d to 7g show the location of the stator magnetic poles and the rotor magnetic poles of the three-phased BLDC motor operating in an open-looped starting step according to the preferred embodiment of the invention.
Figure 7E:
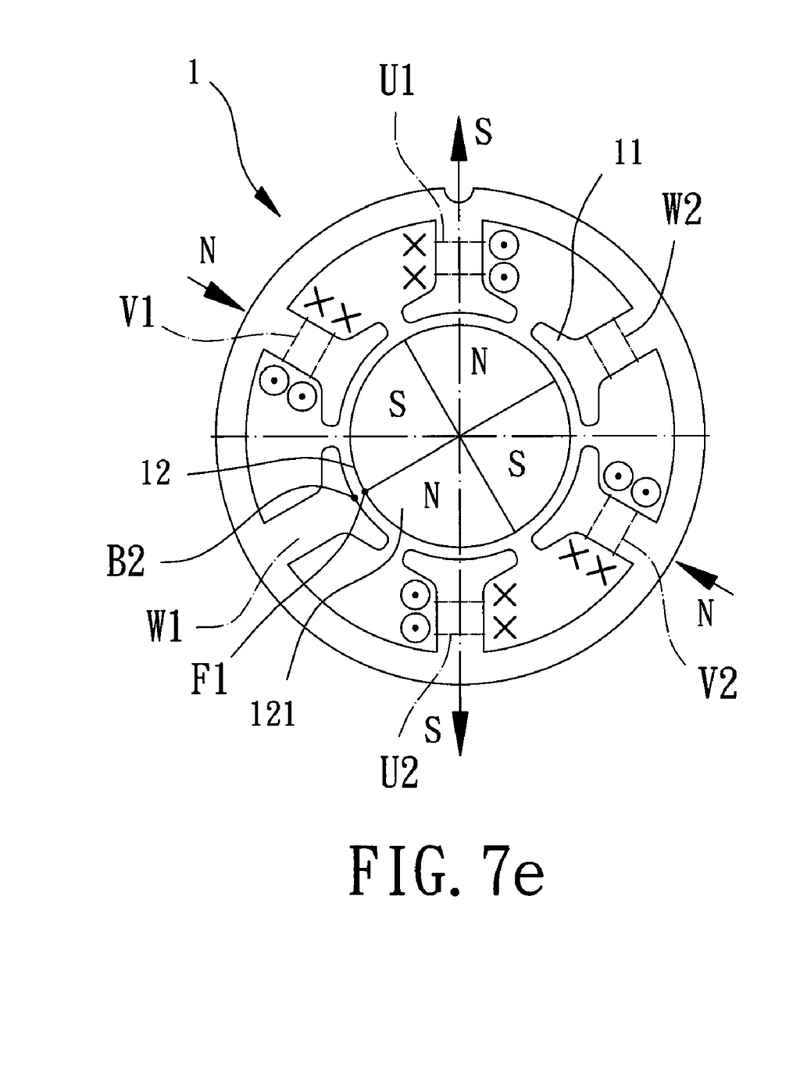
Figure 7F:
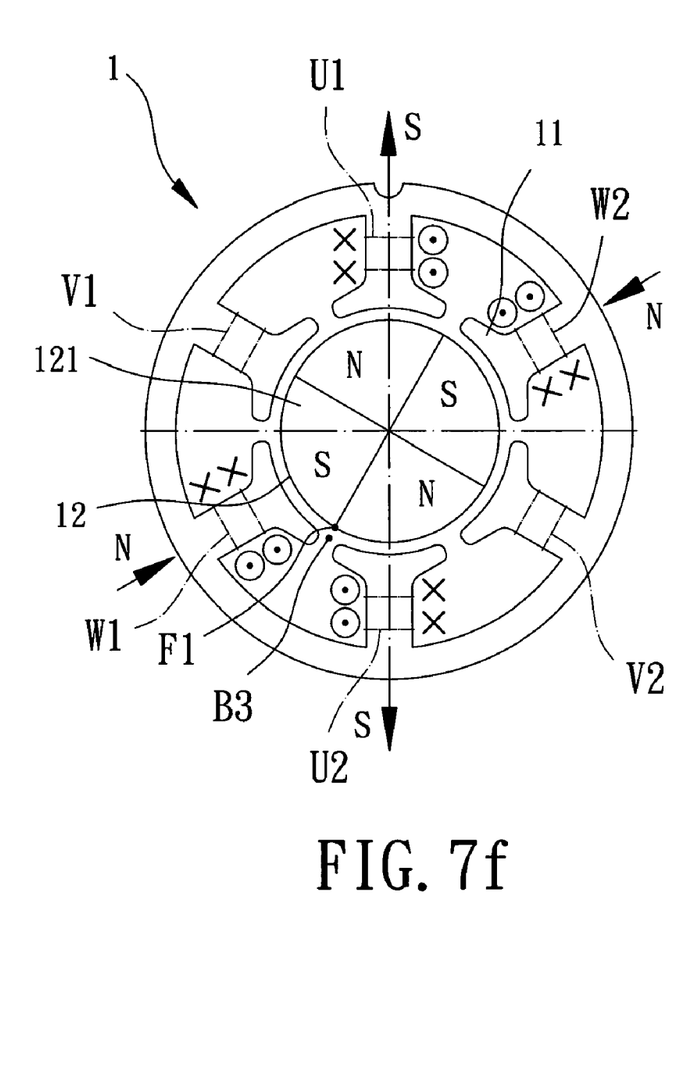
Figure 7G:
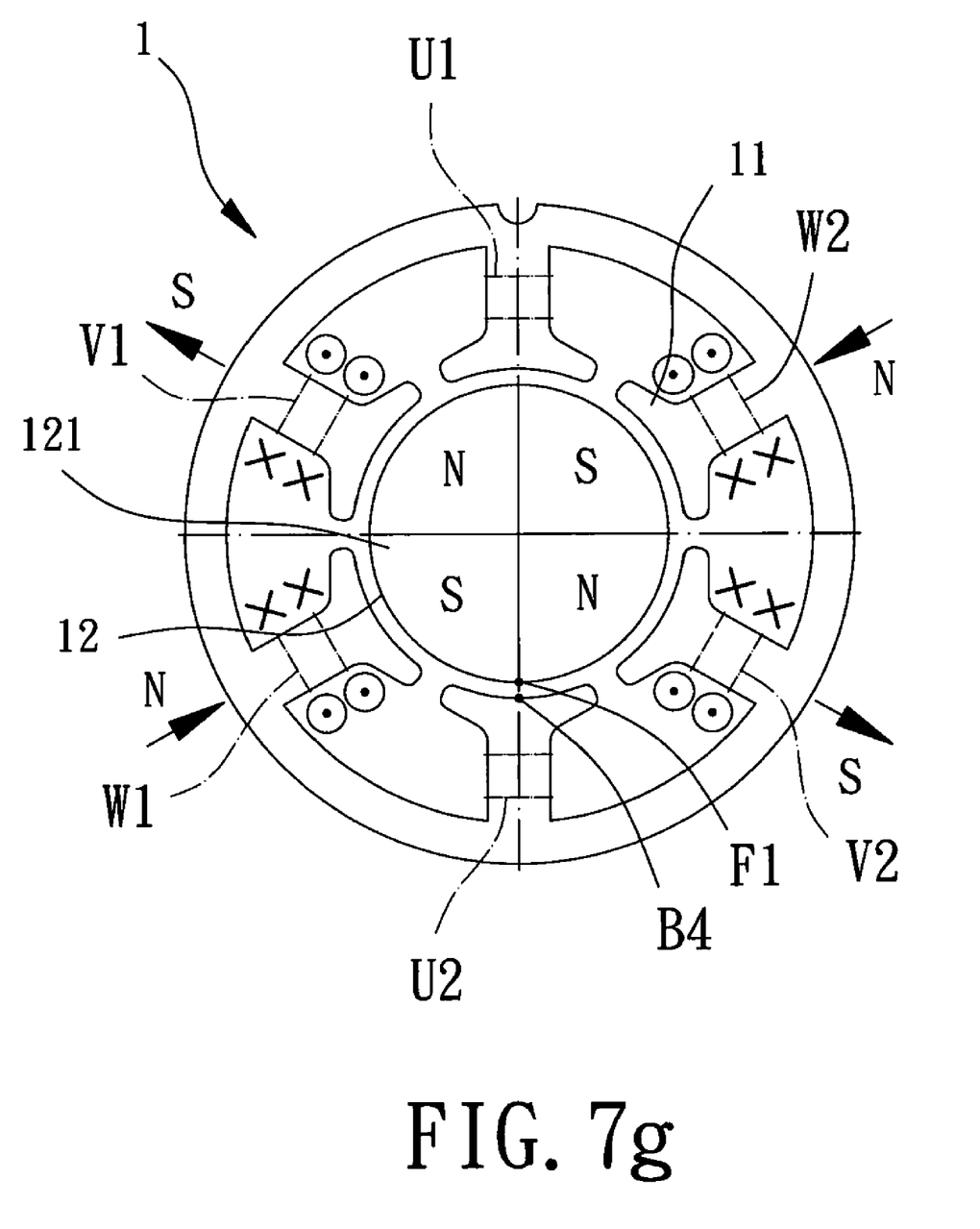

Please refer to FIGS. 6, 7b and 7c, in the second rotor-positioning step S2, the coil unit is operated in a second excitation state in order for the rotor 12 to rotate from the first position A1 to a second position A2, driving the rotor 12 to position in the second position A2. More specifically, by turning on the electronic switches M2 and M3 for a second positioning time interval T2, the coils U1 and U2 are excited to generate an N-pole magnetic field and the coils W1 and W2 are excited to generate an S-pole magnetic field. Based on this, adjacent two of the rotor magnetic poles 121 with different magnetic poles may be magnetically attracted by the N-pole magnetic field generated by the coil U1 and the S-pole magnetic field generated by the coil W1 respectively, driving the rotor 12 to rotate in another small angle until the rotor magnetic pole border F1 is aligned with the second position A2. The second position A2 is located in the middle location of the stator magnetic pole 11 that is wound with the coil V1, as shown in FIG. 7c.

As a further comparison between the FIGS. 7a and 7c, the first position A1 is 30 degree behind the second position A2 in a clockwise direction, with the angle difference between the first position A1 and the second position A2 being smaller than an included angle of each rotor magnetic pole 121. The rotation direction of the rotor 12 rotating from the first position A1 to the second position A2 is the same as the predetermined direction in which the BLDC motor 1 rotates based on the time intervals T1, T2 and R1 to R4 as shown in FIG. 7b.

Based on the above condition, during the second rotor-positioning step S2, it may be chosen that the electronic switches M3 and M4 being turned on such that the rotor 12 rotates from the first position A1 to the second position A2 by 60 degree in a clockwise direction.

In summary, a certain relation between the first position A1 and the second position A2 must be satisfied as illustrated below.

Firstly, the angle of the rotor 12 rotating from the first position A1 to the second position A2 must not exceed the included angle of each rotor magnetic pole 121, in which the included angle is obtained by dividing 360 degree by the number of the rotor magnetic poles 121. In this embodiment, the included angle of each rotor magnetic pole 121 is 90 degree.

Secondly, the rotation direction of the rotor 12 rotating from the first position A1 to the second position A2 must comply with the predetermined direction in which the BLDC motor 1 rotates.

Through the first rotor-positioning step S1 and the second rotor-positioning step S2, even though a dead angle case shown in FIG. 4 has occurred during the first rotor-positioning step S1, the rotor 12 may be forced to rotate in a counter-clockwise direction until the rotor magnetic pole border F1 is aligned with the second position A2 via the second rotor-positioning step S2. In this way, the positioning efficiency of the BLDC motor 1 while starting the BLDC motor 1 may be improved.

During the open-looped starting step S3, each coil of the coil unit is excited by the supply voltage in sequence based on the driving time intervals R1 to R4 so as to drive the rotor 12 to rotate in the predetermined direction. Specifically, the electronic switches M1 to M6 in FIG. 6 are switched in turn based on the driving time intervals R1 to R4 shown in FIG. 7b so as to control the direction of current passing through the coils U1, V1, W1, U2, V2 and W2. During the step, each coil of the coil unit of the BLDC motor 1 is excited in sequence in order for the rotor 12 to rotate in the predetermined direction. As a result, as shown in FIGS. 7d to 7g, the rotor magnetic pole border F1 of the rotor 12 rotates through a first starting position B1, a second starting position B2, a third starting position B3 and a fourth starting position B4 in a counterclockwise direction, thus creating a back electromotive force.

Please refer to FIG. 7b again, the length of the positioning time intervals T1 and T2 is larger than that of the driving time intervals R1 to R4. Typically, the length of the positioning time intervals T1 and T2 may be at least two times larger than that of the driving time intervals R1 to R4. Moreover, the BLDC motor 1 may operate under a lower supply voltage compared to the traditional ones for power saving. Namely, the waveform magnitude during the time intervals T1, T2 and R1 to R4 may be adjusted to be lower than that during the time intervals X1 and Y1 to Y4, thereby achieving the power saving.

During the close-looped operation step S4, a controller 2 controls the close-looped rotational speed of the BLDC motor 1 based on a feedback of the back EMF. More specifically, referring to FIG. 6, the back EMF is detected by a detection circuit 3 and the detection circuit 3 generates a control signal following the detection. The control signal is sent to the controller 2 so as to control the BLDC motor 1 to rotate in a constant speed after the rotational speed of the BLDC motor 1 has achieved a predetermined level. According to the steps S1 to S4, the sensorless starting control method for the BLDC motor 1 is provided. Wherein, the detection circuit 3 is used to convert the back EMF into a voltage level suitable for the controller 2, avoiding the damage of the controller 2.

In summary, the dead angle of the traditional motor 9 may be overcome via the proposed first rotor-positioning step S1 and the second rotor-positioning step S2. Therefore, the invention has achieved advantages such as high positioning accuracy, low power consumption and improved starting efficiency.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A sensorless starting control method for a brushless direct current (BLDC) motor, comprising:
    a first rotor-positioning step configured to position a rotor in a first position by operating a coil unit in a first excitation state;
    a second rotor-positioning step configured to operate the coil unit in a second excitation state such that the rotor rotates from the first position to a second position;
    an open-looped starting step configured to excite a plurality of coils of the coil unit in sequence so as to drive the rotor to rotate in a predetermined direction, wherein the coil unit generates a back electromotive force (EMF) when the rotor rotates in the predetermined direction; and
    a close-looped operation step configured to control the BLDC motor to attain a predetermined rotational seed via a feedback of the back EMF,
    wherein the rotor comprises a plurality of rotor magnetic poles, the angle of the rotor rotating from the first position to the second position is not larger than an included angle of a single one of the rotor magnetic poles, and the included angle of the single one of the rotor magnetic poles is obtained by dividing 360 degrees by the number of the rotor magnetic poles, wherein adjacent two of the plurality of rotor magnetic poles with different magnetic poles are magnetically attracted by an N-pole magnetic field generated by one coil U1 of the plurality of coils and an S-pole magnetic field generated by one coil V1 of the plurality of coils during the first rotor-positioning step, so as to drive the rotor to rotate by a small angle until a rotor magnetic pole border where the adjacent two of the plurality of rotor magnetic poles border each other is aligned with the first position, and the first position is located between two stator magnetic poles respectively wound with the coils U1 and V1.

2. The sensorless starting control method for the BLDC motor as claimed in claim 1, wherein the direction of the rotor rotating from the first position to the second position is identical to the predetermined direction.

3. The sensorless starting control method for the BLDC motor as claimed in claim 1, wherein the coil unit is operated in the first excitation state via a first positioning time interval during the first rotor-positioning step, the coil unit is operated in the second excitation state via a second positioning time interval during the second rotor-positioning step, the plurality of coils of the coil unit is excited in sequence according to a plurality of driving time intervals, and the length of the first and second positioning time intervals is larger than that of the plurality of driving time intervals.

4. The sensorless starting control method for the BLDC motor as claimed in claim 3, wherein the length of the first and second positioning time intervals is at least two times larger than that of the driving time intervals.

5. A sensorless starting control method for the BLDC motor, comprising:
 a first rotor-positioning step configured to position a rotor in a first position by operating a coil unit in a first excitation state;
 a second rotor-positioning step configured to operate the coil unit in a second excitation state such that the rotor rotates from the first position to a second position;
 an open-looped starting step configured to excite a plurality of coils of the coil unit in sequence so as to drive the rotor to rotate in a predetermined direction, wherein the coil unit generates a back electromotive force (EMF) when the rotor rotates in the predetermined direction; and
 a close-looped operation step configured to control the BLDC motor to attain a predetermined rotational speed via a feedback of the back EMF, wherein the coil unit is operated in the first excitation state via a first positioning time interval during the first rotor-positioning step, the coil unit is operated in the second excitation state via a second positioning time interval during the second rotor-positioning step, the plurality of coils of the coil unit is excited in sequence according to a plurality of driving time intervals, and the length of the first and second positioning time intervals is larger than that of the plurality of driving time intervals wherein adjacent two of the plurality of rotor magnetic poles with different magnetic poles are magnetically attracted by an N-pole magnetic field generated by one coil U1 of the plurality of coils and an S-pole magnetic field generated by one coil W1 of the plurality of coils during the second rotor-positioning step, so as to drive the rotor to rotate by a small angle until a rotor magnetic pole border where the adjacent two of the plurality of rotor magnetic poles border each other is aligned with the second position, and the second position is located in the middle location of a stator magnetic pole that is wound with a coil V1 of the plurality of coils.

6. The sensorless starting control method for the BLDC motor as claimed in claim 5, wherein the rotor comprises a plurality of rotor magnetic poles, the angle of the rotor rotating from the first position to the second position is not larger than an included angle of a single one of the rotor magnetic poles, and the included angle of the single one of the rotor magnetic poles is obtained by dividing 360 degree by the number of the rotor magnetic poles.

7. The sensorless starting control method for the BLDC motor as claimed in claim 5, wherein the direction of the rotor rotating from the first position to the second position is identical to the predetermined direction.

8. The sensorless starting control method for the BLDC motor as claimed in claim 5, wherein the length of the first and second positioning time intervals is at least two times larger than that of the driving time intervals.

* * * * *